United States Patent [19]

Asanuma et al.

[11] Patent Number: 5,260,395
[45] Date of Patent: Nov. 9, 1993

[54] METHOD FOR MOLDING SYNDIOTACTIC POLYPROPYLENE AND MOLDED ARTICLE

[75] Inventors: Tadashi Asanuma; Tateyo Sasaki; Mitsuru Ito; Shigeru Kimura, all of Takaishi; Takeo Inoue, Kawachinagano, all of Japan

[73] Assignee: Mitsui Toatsu Chemicals, Inc., Tokyo, Japan

[21] Appl. No.: 928,062

[22] Filed: Aug. 11, 1992

Related U.S. Application Data

[62] Division of Ser. No. 679,522, Apr. 2, 1991, Pat. No. 5,200,131.

[30] Foreign Application Priority Data

| Apr. 9, 1990 | [JP] | Japan | 2-92304 |
| Apr. 9, 1990 | [JP] | Japan | 2-92305 |
| Jul. 23, 1990 | [JP] | Japan | 2-192929 |
| Aug. 13, 1990 | [JP] | Japan | 2-211584 |
| Nov. 14, 1990 | [JP] | Japan | 2-306136 |

[51] Int. Cl.⁵ ............ C08F 10/06; C08F 110/06; C08F 210/06
[52] U.S. Cl. .................... 526/348.1; 526/351
[58] Field of Search ................ 526/348.1, 351

[56] References Cited

U.S. PATENT DOCUMENTS

| 4,255,381 | 3/1981 | Eustance et al. | 264/519 |
| 4,287,249 | 9/1981 | Eustance et al. | 264/210.7 |
| 4,793,885 | 12/1988 | Rasmussen | 264/210.2 |
| 4,892,851 | 1/1990 | Ewen et al. | 502/104 |

FOREIGN PATENT DOCUMENTS 0428972 5/1991 European Pat. Off.
0466926 1/1992 European Pat. Off.
90/12057 10/1990 PCT Int'l Appl.

OTHER PUBLICATIONS

World Patents Index Latest, Week 8340, Derwent Publications Ltd., London, GB; AN 83-779353[40] & JP-A-58 142 818 (Idsemitsu Petrochem, KK) Aug. 25, 1983.

World Patents Index Latest, Week 9101, Derwent Publications Ltd., London, GB; AN 86-261852[40] & JP-A-61 189 920 (Idsemitsu Petrochem, KK) Aug. 23, 1986.

*Primary Examiner*—Joseph L. Schofer
*Assistant Examiner*—David Wu
*Attorney, Agent, or Firm*—Burns, Doane, Swecker & Mathis

[57] ABSTRACT

A method for molding a polypropylene or a propylene copolymer having a syndiotactic structure which comprises the steps of melting, molding, if desired, quenching and then stretching a propylene homopolymer or a copolymer of propylene and a small amount of ethylene or another α-olefin which has a substantially syndiotactic structure, or a mixture of the same and a small amount of a polypropylene having a substantially isotactic structure. The molded and stretched article can be heated at a temperature of a molding temperature or more, while a load is applied to the article. Furthermore, the molded and stretched article, if desired, can be treated with a hydrocarbon vapor, while a load is applied to the article. The molded article obtained by the method of the present invention has a novel crystalline structure.

2 Claims, 9 Drawing Sheets

METHOD FOR MOLDING SYNDIOTACTIC POLYPROPYLENE AND MOLDED ARTICLE

This application is a divisional of Application Ser. No. 07/679,522, filed Apr. 2, 1991 now U.S. Pat. No. 5,200,131.

BACKGROUND OF THE INVENTION (a) Field of the Invention

The present invention relates to a method for preparing molded articles of syndiotactic polypropylene and the molded articles. More specifically, it relates to a method for molding syndiotactic polypropylene which comprises the steps of melting, molding and stretching syndiotactic propylene homopolymer having a relatively high tacticity, syndiotactic copolymer of propylene and a small amount of ethylene or another $\alpha$-olefin having a relatively high tacticity, or a mixture of the same and isotactic polypropylene, and it also relates to the thus obtained molded article.

(a) Description of the Prior Art

Syndiotactic polypropylene has been known for a long period of time. However, syndiotactic polypropylene prepared by polymerization at a low temperature in the presence of a conventional catalyst comprising a vanadium compound, an ether and an organic aluminum compound was poor in syndiotacticity and had elastomer-like characteristics. Therefore, the thus prepared polypropylene was hardly considered to have characteristic properties as syndiotactic propylene. In recent years, polypropylene having good tacticity, i.e., a syndiotactic pentad fraction of more than 0.7 has been discovered for the first time by J. A. Ewen et al. which can be obtained by the use of a catalyst comprising a transition metal compound having asymmetric ligands and an aluminoxane (J. Am. Chem. Soc., Vol. 110, p. 6255–6256, 1988).

In a molded article which can be prepared by molding, in a usual molding manner, syndiotactic polypropylene obtained by the above-mentioned method, a copolymer, having a substantially syndiotactic structure, of propylene and ethylene or another $\alpha$-olefin, or a mixture of the same and a small amount of polypropylene having a substantially isotactic structure, impact resistance is relatively excellent, but stiffness is not so sufficient. In consequence, this kind of molded article is not considered to be excellent in the balance of physical properties.

SUMMARY OF THE INVENTION

An object of the present invention is to provide a method for molding a propylene homopolymer or a copolymer of propylene and a small amount of ethylene or another $\alpha$-olefin which has a syndiotactic structure, or a mixture of the same and isotactic polypropylene, which process permits easily obtaining molded articles having a high crystallinity and excellent physical properties.

Another object of the present invention is to provide a molded article having a novel crystalline structure and excellent physical properties which can be obtained from the above-mentioned propylene homopolymer or copolymer, or the above-mentioned mixture.

According to the present invention, there can be provided the following molding method and molded article.

A method for molding a syndiotactic polypropylene which comprises the steps of melting, molding and then stretching a homopolymer of propylene having a substantially syndiotactic structure, a copolymer of propylene and a small amount of ethylene or another $\alpha$-olefin having a substantially syndiotactic structure, or a mixture of the same and a small amount of polypropylene having a substantially isotactic structure.

A molded article of polypropylene having a substantially transzigzag crystalline structure which is a rhombic system having lattice constants of $a=5.22$, $b=11.17$ and $c=5.06$ Å which is obtained by melting, molding and then stretching a homopolymer of propylene having a substantially syndiotactic structure, a copolymer of propylene and a small amount of ethylene or another $\alpha$-olefin having a syndiotactic structure, or a mixture of the same and a small amount of polypropylene having a substantially isotactic structure.

A molded article of polypropylene having a triclinic system in which lattice constants determined by X-ray diffraction are $a=5.72$, $=7.64$ and $c=11.6$ Å, $\alpha=73.1°$, $\beta=88.8°$ and $Y=112.0°$ which is obtained by melting and molding polypropylene having a substantially syndiotactic structure, the above-mentioned copolymer, or a mixture of the same and a small amount of polypropylene having a substantially isotactic structure, if desired, quenching and stretching the molded material, and then treating it with a hydrocarbon compound vapor.

DESCRIPTION OF THE PREFERRED EMBODIMENTS

Figure 1:
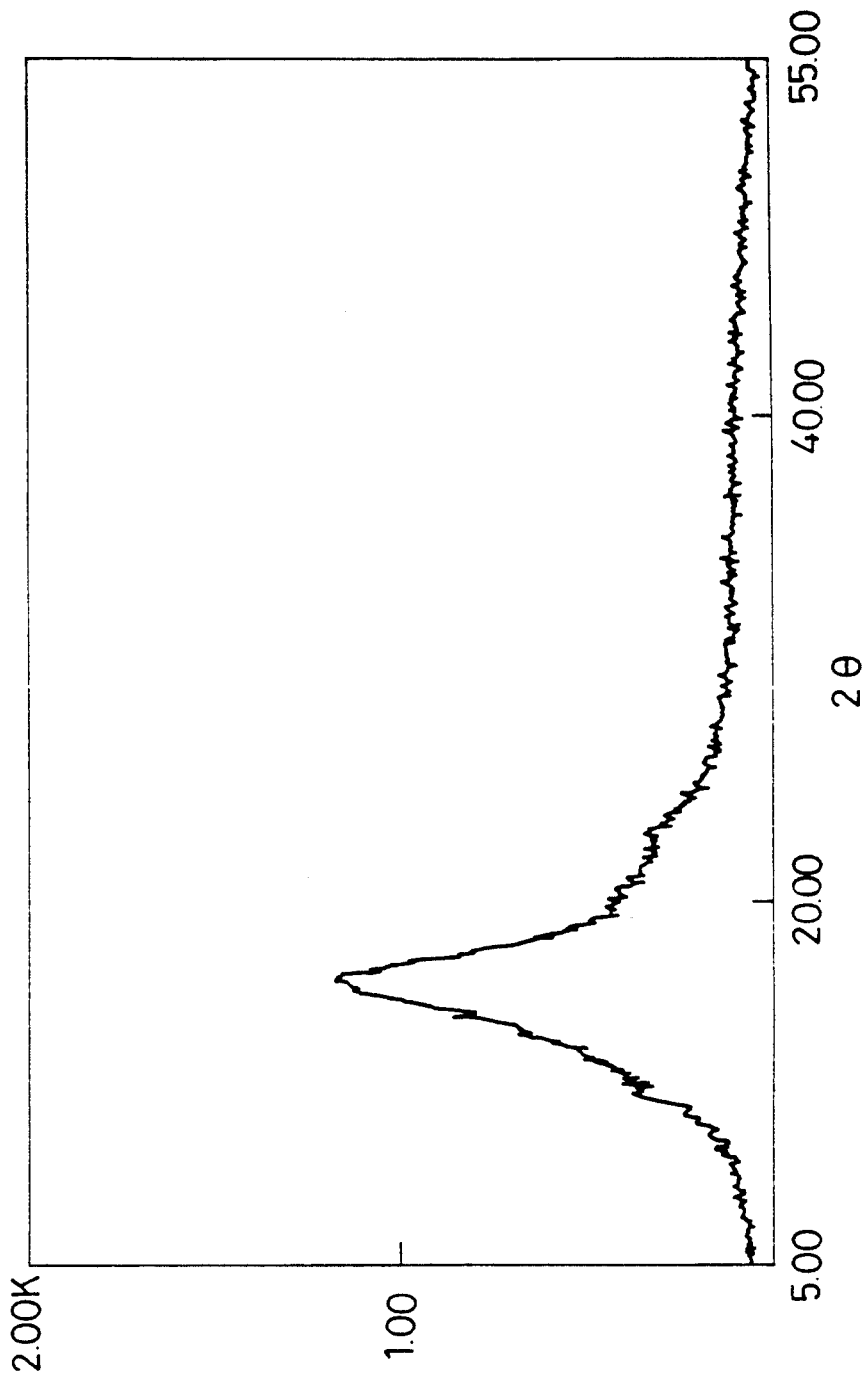
FIG. 1 shows an X-ray diffraction spectrum of an unstretched sheet in Example 1.

In the present invention, a homopolymer of propylene having a substantially syndiotactic structure is crystalline polypropylene having a highly syndiotactic structure in which in the absorption spectrum of $^{13}$C-NMR measured in a 1,2,4-trichlorobenzene solution at 135° C., the peak intensity of methyl groups attributed to the syndiotactic pentad structure observed at about 20.2 ppm on the basis of tetramethylsilane is 0.5 or more, preferably 0.7 or more of the total peak intensity of all the methyl groups, 10% by weight or less of the above-mentioned crystalline polypropylene being soluble in toluene at room temperature. A copolymer of propylene and ethylene or another $\alpha$-olefin having the substantially syndiotactic structure is a copolymer containing 20% by weight or less of ethylene or the $\alpha$-olefin other than propylene and having a highly syndiotactic structure in which in the absorption spectrum of $^{13}$C-NMR which is similarly measured, the peak intensity observed at about 20.2 ppm is 0.3 or more, preferably 0.5 or more of the total peak intensity attributed to the methyl group of all the propylene units.

The above-mentioned polypropylene or propylene copolymer having the syndiotactic structure can be prepared by polymerizing propylene or propylene and ethylene or another α-olefin in the presence of a catalyst comprising a transition metal compound having asymmetric ligands and an aluminoxane.

Examples of the transition metal compound having the asymmetric ligands include isopropyl(cyclopentadienyl-1-fluorenyl)hafnium dichloride and isopropyl(cyclopentadienyl-1-fluorenyl)zirconium dichloride which are described in the above-mentioned J. A. Ewen et al. literature. In addition, examples of the aluminoxane include compounds represented by the formula R-(AlRO)$_n$Al-R$_2$ or

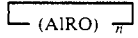

(wherein R is a hydrocarbon residue having 1 to 3 carbon atoms). In particular, what is suitably used in the present invention is the aluminoxane in which R is methylaluminoxane and n is 5 or more, preferably from 10 or more. The amount of the aluminoxane to be used is from 10 to 1,000,000 mole times, usually from 50 to 5,000 mole times as much as that of the transition metal compound.

Another catalyst having a structure which is different from that of the above-mentioned catalyst can also be utilized in the present invention, so long as it can provide polypropylene having a syndiotactic pentad fraction of 0.7 or more when used in the homopolymerization of propylene.

No particular restriction is put on a polymerization process, and various polymerization techniques are utilizable such as solvent polymerization using an inert solvent, bulk polymerization in which there is substantially no inert solvent, and gas phase polymerization. Usually, the polymerization temperature is from −100° to 200° C. and the polymerization pressure is from atmospheric pressure to 100 kg/cm$^2$. Preferably, the temperature is from −100° to 100° C. and the pressure is from atmospheric pressure to 50 kg/cm$^2$.

Examples of the other α-olefin which can be used in the copolymerization with propylene include α-olefins having 4 to 20 carbon atoms. Typical examples of these α-olefins are straight-chain α-olefins such as butene-1, pentene-1, hexene-1, heptene-1, octene-1, nonene-1, decene-1, undecene-1, dodecene-1, tridecene-1, tetradecene-1, pentadecene-1, hexadecene-1 and octadecene-1, and branched α-olefins such as 3-methylbutene-1,4-methylpentene-1 and 4,4-dimethylpentene-1.

The ratio of the above-mentioned α-olefin unit to the copolymer is preferably 20% by weight or less, particularly preferably 10% by weight or less. When the ratio of the other olefin is in excess of 20% by weight, the stiffness of molded articles deteriorates unpreferably. No particular restriction is put on conditions for the copolymerization, and about the same polymerization conditions as in the case of the homopolymerization of propylene can be employed.

In order to further improve the syndiotacticity of the obtained (co)polymer, this (co)polymer can be washed with a solvent which can dissolve or disperse a low-molecular atactic component therein, and examples of such a solvent include hydrocarbon solvents having 3 to 20 carbon atoms such as propylene, saturated aliphatic hydrocarbons, aromatic hydrocarbons and halogenated hydrocarbons, alcohols having 1 to 20 carbon atoms, and ethers and esters having 2 to 20 carbon atoms. No particular restriction is put on a washing manner, and the washing can be carried out at a temperature of 0° to 100° C.

The homopolymerization and copolymerization of propylene can usually be carried out in accordance with a one-step polymerization. The thus obtained polymer has a narrow molecular weight distribution, and a ratio of the weight average molecular weight to the number average molecular weight of the polymer (hereinafter referred to simply as "MW/MN") measured at 135° C. by a gel permeation chromatography is usually from about 1.5 to about 3.5. However, the polymer having a wide molecular weight distribution of from about 3.5 to about 15 can be prepared by using two kinds of transition metal compounds (e.g., the combined use of zirconium and hafnium compounds is effective) or mixing two or more kinds of (co)polymers having different molecular weights, and therefore it is possible to utilize the (co)polymer having MW/MN of from 1.5 to 15 in the present invention.

The molecular weight of the polymer used in the present invention is usually such that its intrinsic viscosity (hereinafter referred to simply as "η") measured in a tetralin solution at 135° C. is preferably from about 0.1 to about 20, particularly preferably from 0.5 to 10.0.

In the present invention, a part, e.g., less than 50%, preferably 40% or less, of syndiotactic polypropylene or a propylene copolymer having a syndiotactic structure can be replaced with polypropylene having an isotactic structure, and in such a case, molded articles having high stiffness can be obtained. In this case, various kinds of commercially available isotactic polypropylene products can be utilized. The isotactic polypropylene can be manufactured by the use of a catalyst for providing polypropylene having the so-called highly steric regularity, which catalyst comprises titanium trichloride and an organoaluminum compound, or titanium trichloride or titanium tetrachloride supported on the magnesium halide and an organoaluminum compound. This polypropylene preferably has an isotactic pentad fraction of 0.9 or more. Furthermore, in the preferably utilizable isotactic polypropylene, η measured in the tetralin solution at 135° C. is preferably from about 0.1 to about 10, particularly preferably about 0.5 to about 5. In the method of the present invention, if the amount of the polypropylene having the isotactic structure is 50% by weight or more, impact resistance is poor.

In the present invention, the propylene homopolymer or the copolymer of propylene and a small amount of ethylene or another α-olefin which has a substantially syndiotactic structure, or the mixture of the same and a small amount of the polypropylene having a substantially isotactic structure is first melted by heating and then molded into a specified shape. No particular restriction is put on a molding process, and extrusion molding, press molding or injection molding can be employed. In view of the fact that stretching is carried out after the molding, the extrusion molding or a blow molding in which the stretching is successively done after the extrusion can be preferably utilized.

With regard to the molded article of the syndiotactic polypropylene before the stretching, its crystalline structure is important. The molded article in which any diffraction line is not observed in a spacing of about 7.1 Å by X-ray diffraction is convenient, because this kind of molded article can be easily stretched even in the case that a complete transzigzag structure is not intended in a stretched article, and because the stretched article having a smooth surface and good physical properties can be obtained. In the case of the molded article in which the intensive diffraction line is observed in a spacing of about 7.1 Å, the stretching operation is difficult. Here, "the diffraction line is not observed" does not mean that the diffraction line is not seen at all, but that the intensity of the diffraction line is, for example, about 1/5 or less of the maximum peak intensity of an observed diffraction image, when the measurement is made in the 2θ range of from 5 to 50° by the use of Cu-K α rays which is the X rays.

Such an easily stretchable molded article can be obtained by quenching the melted and molded article. The degree of the quench depends upon the tacticity of the syndiotactic polypropylene, the composition of the copolymer and the molecular weight, but one exemplary cooling rate is such that when the (co)polymer to be used is subjected to temperature rise up to 250° C., cooling operation at various cooling rates, and then temperature rise at 10° C./minute in accordance with a differential scanning thermal analysis, the number of an endothermic peak attributed to melting is substantially one. Usually, the cooling rate is 50° C./minute or more.

The thus obtained molded article in which any diffraction line is not observed in a spacing of about 7.1 Å by the measurement of the X-ray diffraction is next stretched. No particular restriction is put on the temperature in the stretching operation. The stretching can be achieved at room temperature, and the the employment of a low stretching rate permits obtaining a high stretch ratio. Nevertheless, it is, needless to say, possible that the stretching is carried out under heating, for the purpose of decreasing stretching stress. The heating temperature should be maintained for a time necessary for the stretching under such conditions that any intensive diffraction line does not appear in a spacing of about 7.1 Å by the measurement of the X-ray diffraction. The temperature in the stretching operation is preferably a temperature lower than the melting point of the polypropylene by 10° C., particularly preferably by 20° C.

After the heating and melting, the quenched molded article can be stretched at a relatively low temperature in the vicinity of ambient temperature, and in particular, when the stretching is made in a high ratio at a low temperature, the molded article of polypropylene exclusively having a substantially transzigzag crystalline structure can be obtained. Furthermore, in the case of syndiotactic polypropylene having a relatively high molecular weight, e.g., η of 1.0 or more, the substantially transzigzag structure can be exclusively obtained by stretching it in a relatively high ratio, e.g., 3 times or more, preferably 10 times or more, instead of quenching it at a rate of 100° C./minute or more so as to obtain the molded article in which any diffraction line is not observed in a spacing of about 7.1 Å by the measurement of the X-ray diffraction. For the purpose of obtaining the substantially transzigzag structure, it is necessary that the stretching temperature is low. If the stretching temperature is in excess of 100° C., the crystalline structure changes, with the result that the molded article exclusively having the conformation of the substantially transzigzag structure cannot be obtained.

With regard to the crystalline structure of polypropylene, isotactic polypropylene takes a helical structure, but syndiotactic polypropylene may take a transzigzag structure [G. Natta et al., Makromol. Chem., Vol. 75, p. 215 (1964)]. However, conventional syndiotactic polypropylene is soluble in a hydrocarbon at room temperature, and for this reason, it can scarcely be contrived to utilize this kind of syndiotactic polypropylene as a molded article of crystalline polypropylene. In addition, in this kind of syndiotactic polypropylene, the complete transzigzag structure has not been identified from the viewpoint of crystallography. On the contrary, it can be confirmed that the molded article of the present invention has a plane zigzag structure so highly that another crystalline structure cannot be observed when inspected by X-rays.

The molded article which has been subjected to the stretching treatment has the crystalline structure which is a rhombic system having lattice constants of $a=5.22$, $b=11.17$ and $c=5.06$.

In the present invention, the stretched article can be subjected to a heat treatment to improve crystallinity and physical properties. It is often carried out that a crystalline polymer is annealed by heating after the molding to heighten the crystallinity and to thereby improve physical properties inclusive of stiffness. In order to improve the crystallinity of polypropylene having a high syndiotacticity merely by heating the same, it is necessary that the temperature of the polypropylene is elevated up to a level near to its melting point, and a long period of time is required, resulting in that the obtained crystallinity is not sufficiently high. In contrast, it has been found that when the stretching is carried out prior to the heating, the improvement of the crystallinity is very effective, though this reason is not apparent.

The temperature for the heat treatment which is employed in the present invention is 50° C. or more, preferably 80° C. or more, less than the melting-point of the molded article, and higher than the stretching temperature. The preferable range of a necessary heating time depend upon the melting point of the polymer, the heating temperature and the stretching degree, and thus it is not particularly limited but in the range of from several seconds to several tens hours. The higher the temperature is, the shorter the time is, and when the heating temperature is 100° C. or more, the heating time is in the range of from several minutes to several tens minutes.

With regard to the molded article in which the stretching degree is high and the diffraction lines in about 7.1 Å on the above-mentioned X-ray diffraction spectrum are decreased noticeably, or the molded article which is obtained by cold-stretching the article (the diffraction lines in about 7.1 Å are not observed or faint) quenched after the heating/melting, the heating time is from several minutes to several tens minutes on condition that the heating temperature is about 100° C. As is apparent from the above, if the heating is carried out after the stretching, the crystallinity sufficiently proceeds even in a short heating time and physical properties are also improved. The heat treatment is preferably carried out while the stretched article is fixed and loaded so as to prevent the molded article from deforming.

In the present invention, the stretched article can be treated with a hydrocarbon compound vapor. This treatment with the vapor is effective even for the stretched article having a rough surface and even for the stretched article, for example, obtained by stretching the unstretched article so as to decrease the relatively intensive diffraction lines in a spacing of 7.1 Å on the X-ray diffraction spectrum. The treatment with the vapor is preferably carried out while the article remains stretched and loaded, thereby preventing the molded article from deforming, and improving the transparency of the polymer which has deteriorated at the time of the stretching.

Examples of the hydrocarbon compound used in the vapor treatment include saturated and unsaturated hydrocarbons having about 5 to about 20 carbon atoms and halogenated hydrocarbons in which a part or all of the hydrogen atoms are replaced with halogen atoms. The preferable examples of these hydrocarbon compounds include saturated hydrocarbon compounds such as pentane, hexane, heptane, octane, nonane, decane and cyclohexane, aromatic hydrocarbon compounds such as benzene, toluene, xylene, ethylbenzene, cumene and cymene, and halogen atom-substituted compounds in which a part of the hydrogen atoms are replaced with halogen atoms.

This vapor treatment can be achieved at ambient temperature, but for the curtailment of a treatment time, heating is also acceptable. A heating temperature is usually 100° C. or less, which is preferable to prevent the molded article from deforming. Furthermore, the treatment time depends upon the treatment temperature, but it is in the range of from about 1 second to about 100 hours, preferably from about 1 minute to about 10 hours.

After this vapor treatment, the hydrocarbon compound contained in the molded article may be removed therefrom by nitrogen or air blow, a treatment under reduced pressure or a heat treatment, if desired. Among other, the molded article which has undergone the vapor treatment can be subjected to the heat treatment at a temperature not more than the melting point of the syndiotactic polypropylene preferably while a load is applied to the article, whereby the physical properties of the molded article can be improved.

If the treatment with the hydrocarbon compound vapor is given to the stretched article having the substantially plane zigzag structure, the molded article of the polypropylene can be obtained which is in the state of a triclinic system having lattice constants of a=5.72, b=7.64, c=11.6 Å, α=73.1°, β=88.8° and γ=112.0°. Such a crystal form has not been known so far, and its characteristics can be expected. In order to obtain the above-mentioned crystal form, the aromatic hydrocarbon compound having 6 to 25 carbon atoms can be preferably utilized as the hydrocarbon compound, and in particular, benzene or its derivatives in which a part or all of the hydrogen atoms are replaced with alkyl groups is preferably used. The treatment with the hydrocarbon compound vapor can be carried out at 50° C. or less for a period of from several minutes to several tens days, preferably for about 1 hour to about 10 days.

In the molding method of the present invention, additives which can usually be used in molding polyolefins may be mixed with the (co)polymer, and examples of the additives include an antioxidant, an ultraviolet light absorber and a crystallization nucleating agent. Any nucleating agent can be used in the present case, so long as it can raise the crystallization temperature of syndiotactic polypropylene. Usually, the usable nucleating agent has a melting point higher than that of syndiotactic polypropylene and a low contact energy with syndiotactic polypropylene. The nucleating agent for isotactic polypropylene can also be used. Examples of the nucleating agent include salts of benzoic acid, benzylidenesorbitols, salts of phosphoric esters, quinacridone, and high-melting polyolefins such as polyvinylcyclohexane, poly(3-methylbutene), crystalline polystyrene and polytrimethylvinylsilane. In addition, inorganic compounds such as talc, kaolin and mica can also be utilized as the nucleating agent. The amount of the nucleating agent to be used depends upon a kind of crystallization nucleating agent, but it is usually in the range of from about 0.01 ppm to about 1% by weight based on the weight of the polymer.

The molding method of the present invention can be applied to the manufacture of sheets, films, fibers, bottles, pipes and the like.

Now, the present invention will be described in more detail in reference to examples and comparative examples. However, it should not be construed that these examples limit the present invention.

EXAMPLE 1

0.2 g of isopropyl(cyclopentadienyl-1-fluorenyl)-zirconium dichloride and 30 g of methylaluminoxane (polymerization degree 16.1) made by Toso Akzo Co., Ltd were added to 80 liters of toluene in a 200-liter autoclave. This isopropyl(cyclopentadienyl-1-fluorenyl)-zirconium dichloride was obtained by converting, into a lithium salt, isopropylcyclopentadienyl-1-fluorene synthesized in an ordinary manner, reacting the same with zirconium tetrachloride, and then recrystallizing the resultant reaction product. Afterward, propylene was polymerized at 20° C. under a polymerization pressure of 3 kg/cm$^2$-G for 2 hours. Methanol and methyl acetoacetate were added to the resultant polymer to treat the polymer at 30° C. The polymer was washed with an aqueous hydrochloric acid solution, and then filtered to obtain 5.6 kg of syndiotactic polypropylene. According to $^{13}$C-NMR, the syndiotactic pentad fraction of this polypropylene was 0.935, and an intrinsic viscosity measured in a tetralin solution at 135° C. was 1.45. Furthermore, MW/MN measured in 1,2,4-trichlorobenzene was 2.2.

3,5-di-t-butyl-4-hydroxytoluene, calcium stearate and octadecyl-3-(3,5-di-t-butyl-4-hydroxyphenyl)propionate were then added to this polypropylene in an amount of 0.1 wt. %, 0.08 wt. % and 0.045 wt. %, respectively, and grains were formed therefrom by an extruder. Next, the grains were melted and then pressed at 200° C. to form a sheet having a thickness of 1 mm, and this sheet was then thrown into water at 0° C. to quench it. In this quenching step, a temperature drop rate was measured by a sensor inserted in the center of the sheet, and it was 250° C./minute. The X-ray diffraction spectrum of this sheet is shown in FIG. 1. Any diffraction lines were observed in a spacing of 7.1 Å (2θ=12.5°). The physical properties of this sheet were then measured.

| | |
|---|---|
| Flexural stiffness: kg/cm$^2$ | ASTM D-747 (23° C.) |
| Tensile yield strength: kg/cm$^2$ | ASTM D-638 (23° C.) |
| Elongation at breakage: % | ASTM D-638 (23° C.) |

-continued

Izod impact strength (notched): ASTM D-638 (23° C., −10° C.)
kg · cm/cm
Haze: %    ASTM D1003

The flexural stiffness was 5,300 kg/cm², the tensile yield strength was 215 kg/cm², the elongation at breakage was 480%, the Izod impact strengths (23° C., −10° C.) were 14.0 and 3.8, respectively, and the haze was 15%.

This sheet was stretched at 10° C. 5 times, and physical properties of the thus stretched film were measured as follows.

Haze: %    ASTM D1003
Tensile strength: kg/cm²

The stretched film was cut into a 50 mm × 20 mm test piece, and this test piece was then pulled at a tensile rate of 200 mm/minute by a tensile strength tester and tensile strength at break was measured.

Elongation: %

In measuring the tensile strength, the elongation of the test piece at break was measured.

The tensile strength was 702 kg/cm², the elongation was 113%, and the haze was 8.3%.

In addition, the stretched test piece was kept stretched at 130° C. for 10 hours, and physical properties were then measured. As a result, the tensile strength was 980 kg/cm², the elongation was 45%, and the haze was 25%.

EXAMPLE 2

The same procedure as in Example 1 was effected except that stretching is carried out at 80° C., and as a result, tensile strength was 680 kg/cm², elongation was 75%, and haze was 22.5%. Furthermore, the stretched article was kept stretched at 130° C. for 10 hours, and physical properties were then measured. As a result, the tensile strength was 950 kg/cm², the elongation was 45%, and the haze was 42%.

COMPARATIVE EXAMPLE 1

Figure 2:
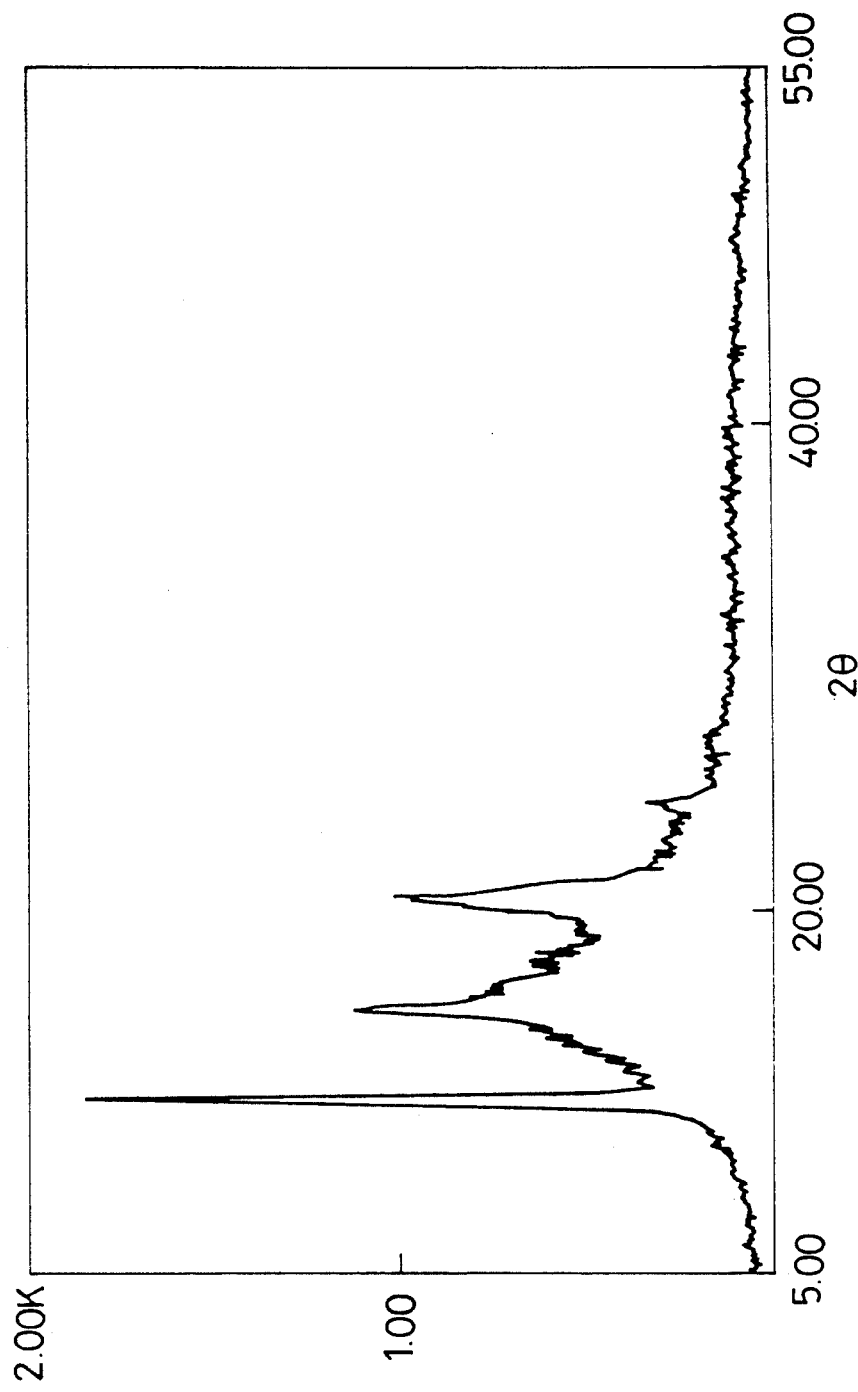
FIG. 2 shows an X-ray diffraction spectrum of an unstretched sheet in Comparative Example 1.

The same procedure as in Example 1 was effected except that a sheet obtained by cooling a molded article over 30 minutes was used. The X-ray diffraction spectrum of this sheet is shown in FIG. 2. When stretched at 10° C. more than twice, the sheet was torn and the stretching was impossible. Furthermore, the sheet was cut even at 80° C. in stretching it 2.5 times and the stretching was not achieved.

EXAMPLE 3

Figure 3:
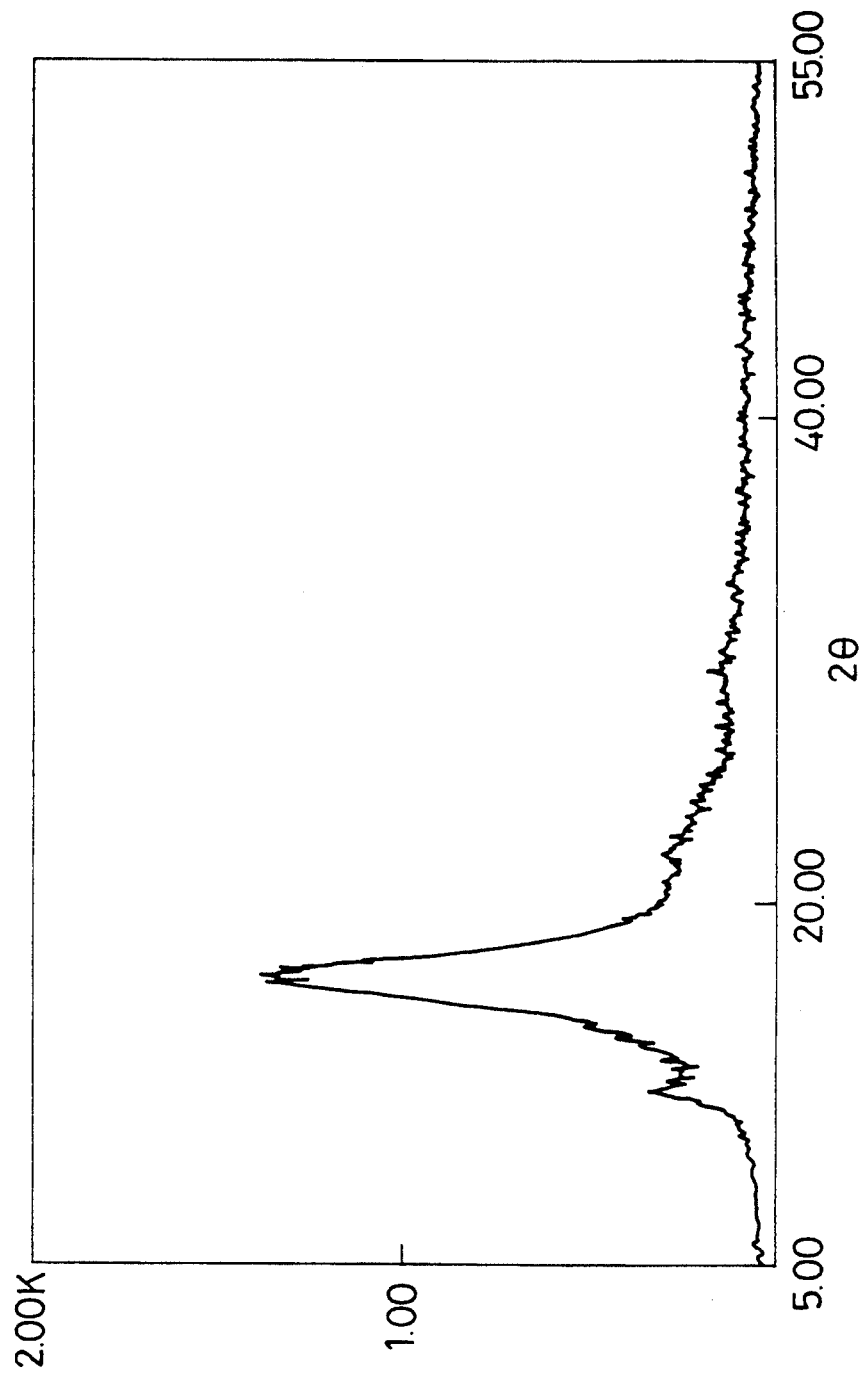
FIG. 3 shows an X-ray diffraction spectrum of an unstretched fiber in Example 3.

Calcium stearate and 2,6-di-t-butylphenol were added to the syndiotactic polypropylene obtained in Example 1 in a ratio of 10 of each of calcium stearate and 2,6-di-t-butylphenol to 10,000 of the polypropylene and talc was further added thereto in a ratio of 10 of talc to 10,000 of the polypropylene, and grains were formed from the mixture. Afterward, spinning was carried out at 220° C. through 14 holes in the die of an extruder having a cylinder diameter of 40 mm at a screw rotational frequency of 64 rpm. Strands coming from the die were introduced into brine at −10° C. and then quenched therein. The thus obtained fiber had a thickness of 370 D/14 strands, and according to a tensile test, maximum strength was 480 and elongation was 680%. The X-ray diffraction spectrum of this fiber which was measured by the use of Cu-K α rays is shown in FIG. 3.

When this fiber was stretched at 25° C. 10 times, maximum strength was 780 g and elongation was 25%. Furthermore, when stretched at 120° C., the maximum strength was 680 g and the elongation was 20%.

COMPARATIVE EXAMPLE 2

Figure 4:
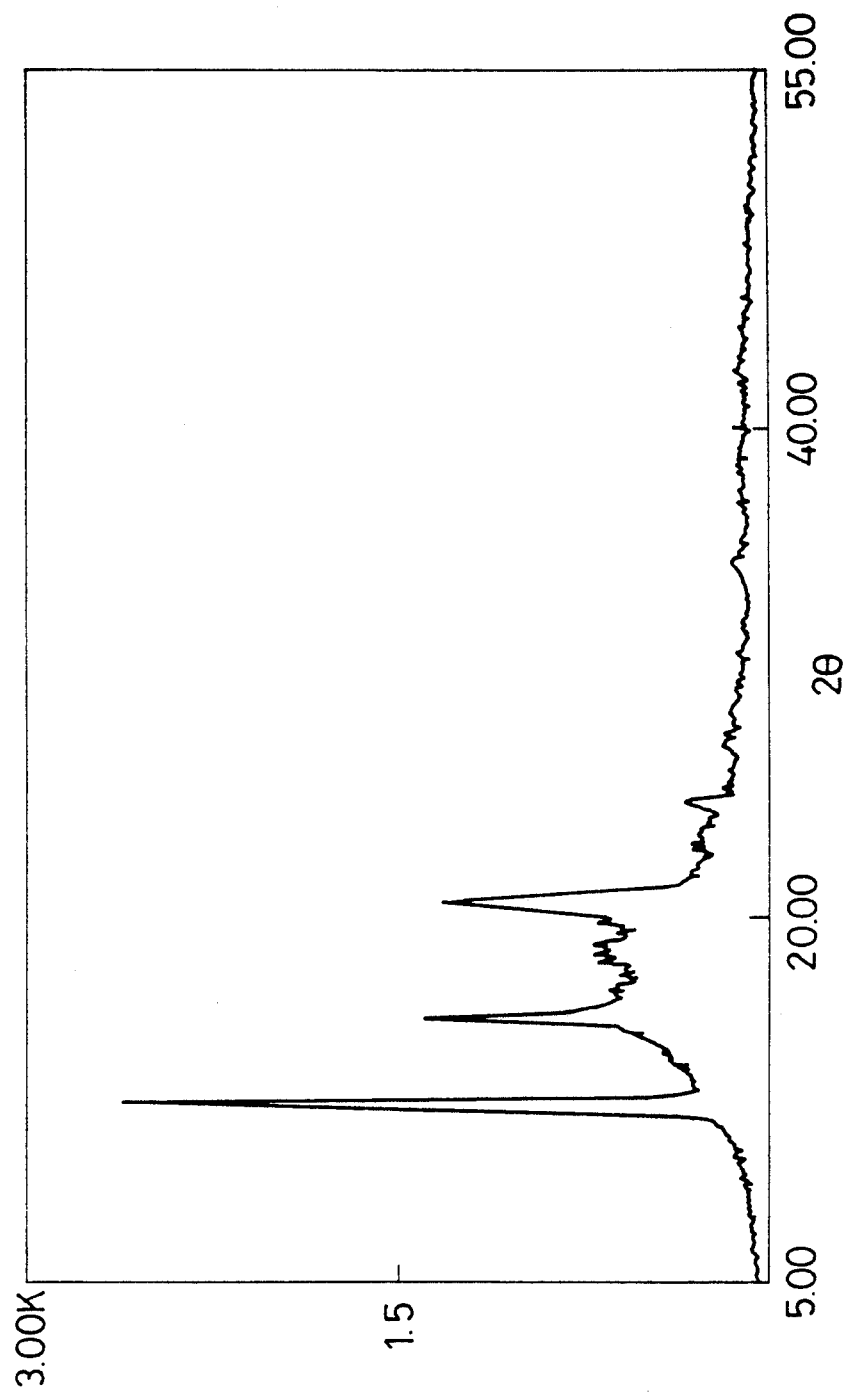
FIG. 4 shows an X-ray diffraction spectrum of an unstretched fiber in Comparative Example 2.

The same procedure as in Example 3 was effected except that strands coming from the die were cooled in the air and then maintained at 120° C. for 5 hours. The X-ray diffraction spectrum of this fiber is shown in FIG. 4. When stretched at 25° C. twice, this fiber was torn, and when stretched even at 120° C. 3 times, the fiber was torn.

EXAMPLE 4

Calcium stearate and 2,6-di-t-butylphenol were added to the polypropylene obtained in Example 1 in a ratio of 10 of each of calcium stearate and 2,6-di-t-butylphenol to 10,000 of the polypropylene and talc was further added thereto in a ratio of 10 of talc to 10,000 of the polypropylene, and grains were formed from the mixture. Afterward, spinning was carried out at 220° C. through a 14 holes in the die of an extruder having a cylinder diameter of 40 mm at a screw rotational frequency of 64 rpm. Strands coming from the die were introduced into brine at −10° C. and then quenched therein. The thus obtained fiber had a thickness of 370 D/14 strands, and according to a tensile test, maximum strength was 480 and elongation was 680%.

Figure 5:
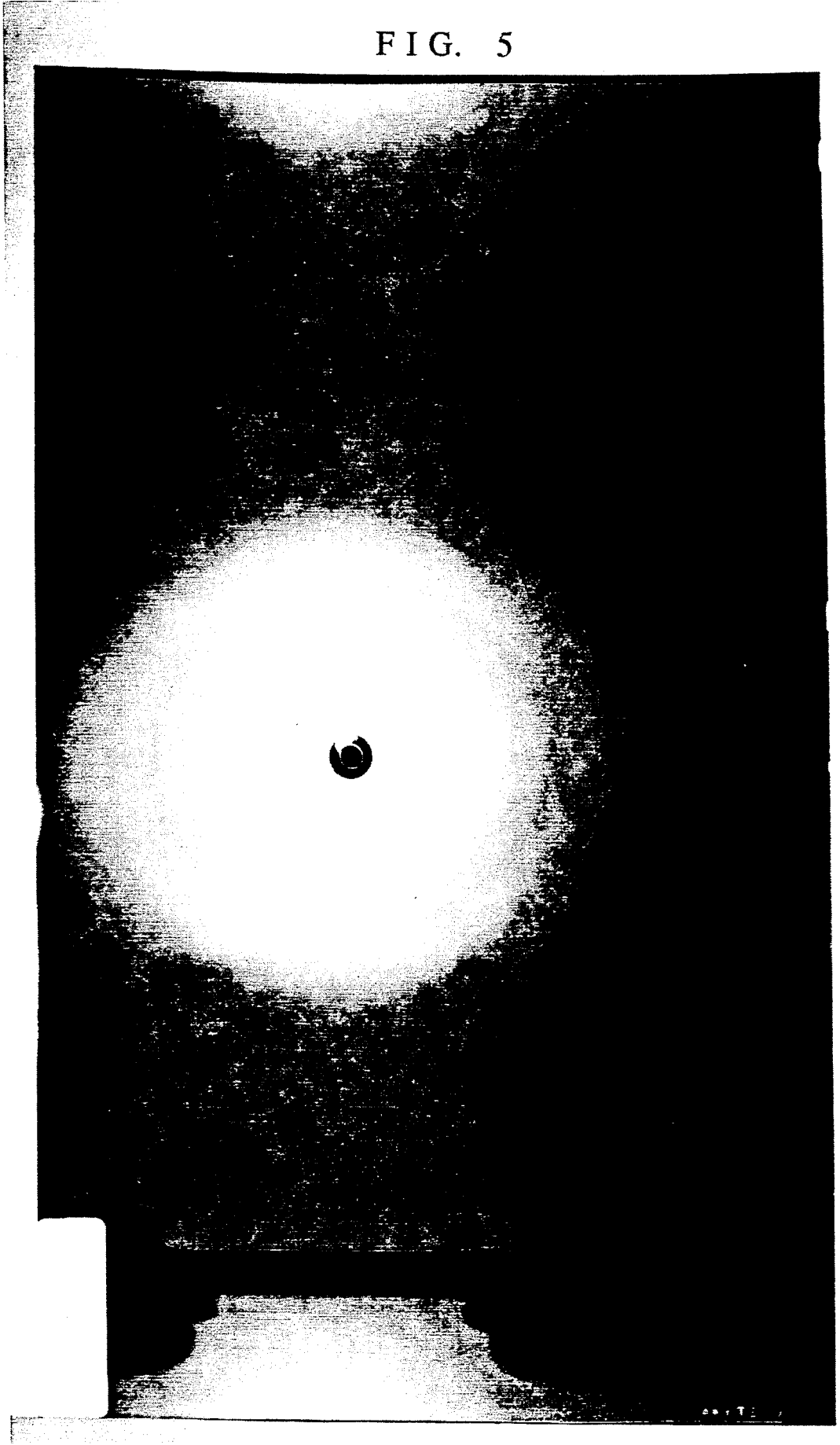
FIG. 5 shows a fiber photograph of an unstretched fiber in Example 4 by a cylindrical camera.
Figure 6:
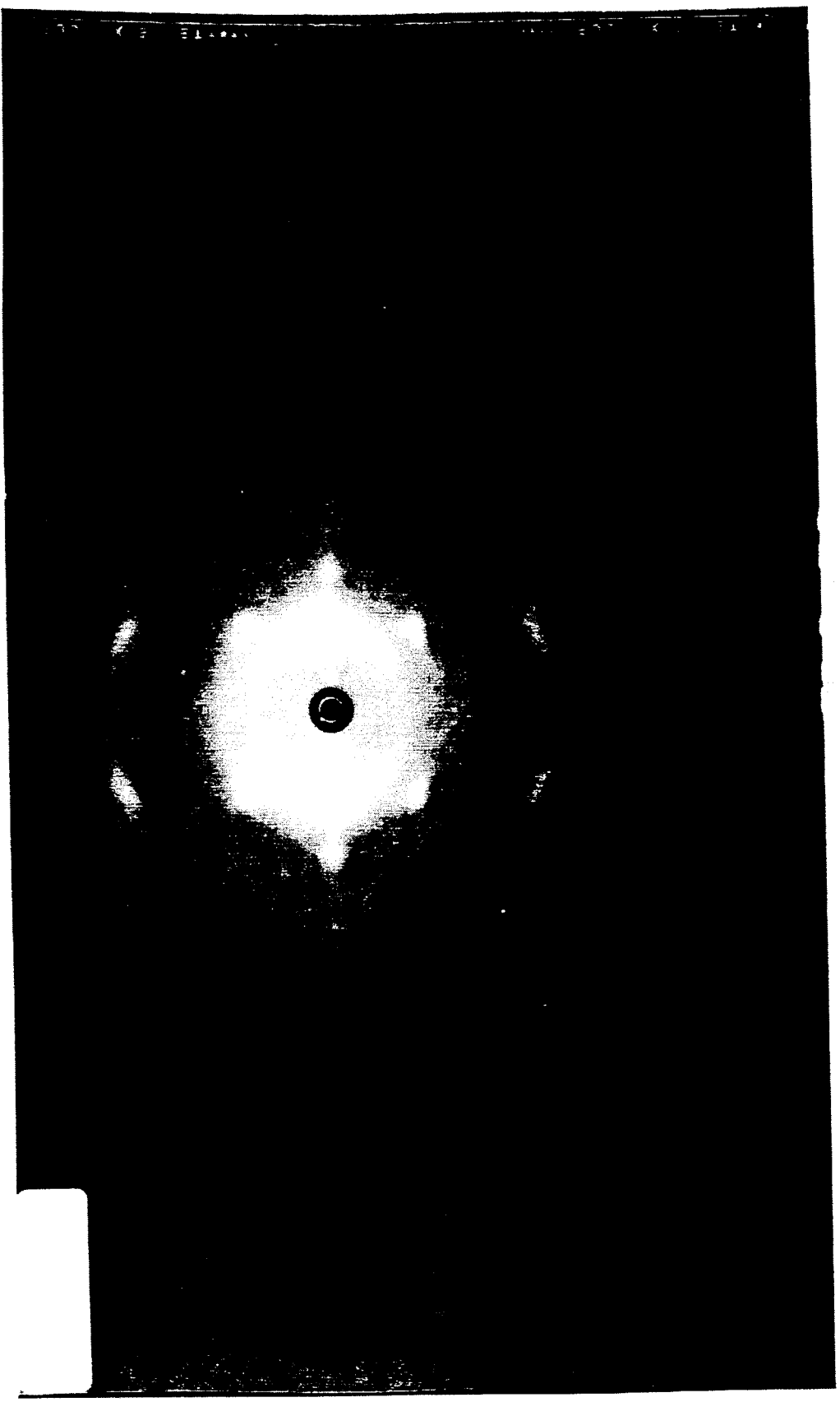
FIG. 6 shows a fiber photograph of a fiber stretched at 25° C. in Example 4 by a cylindrical camera.
Figure 7:
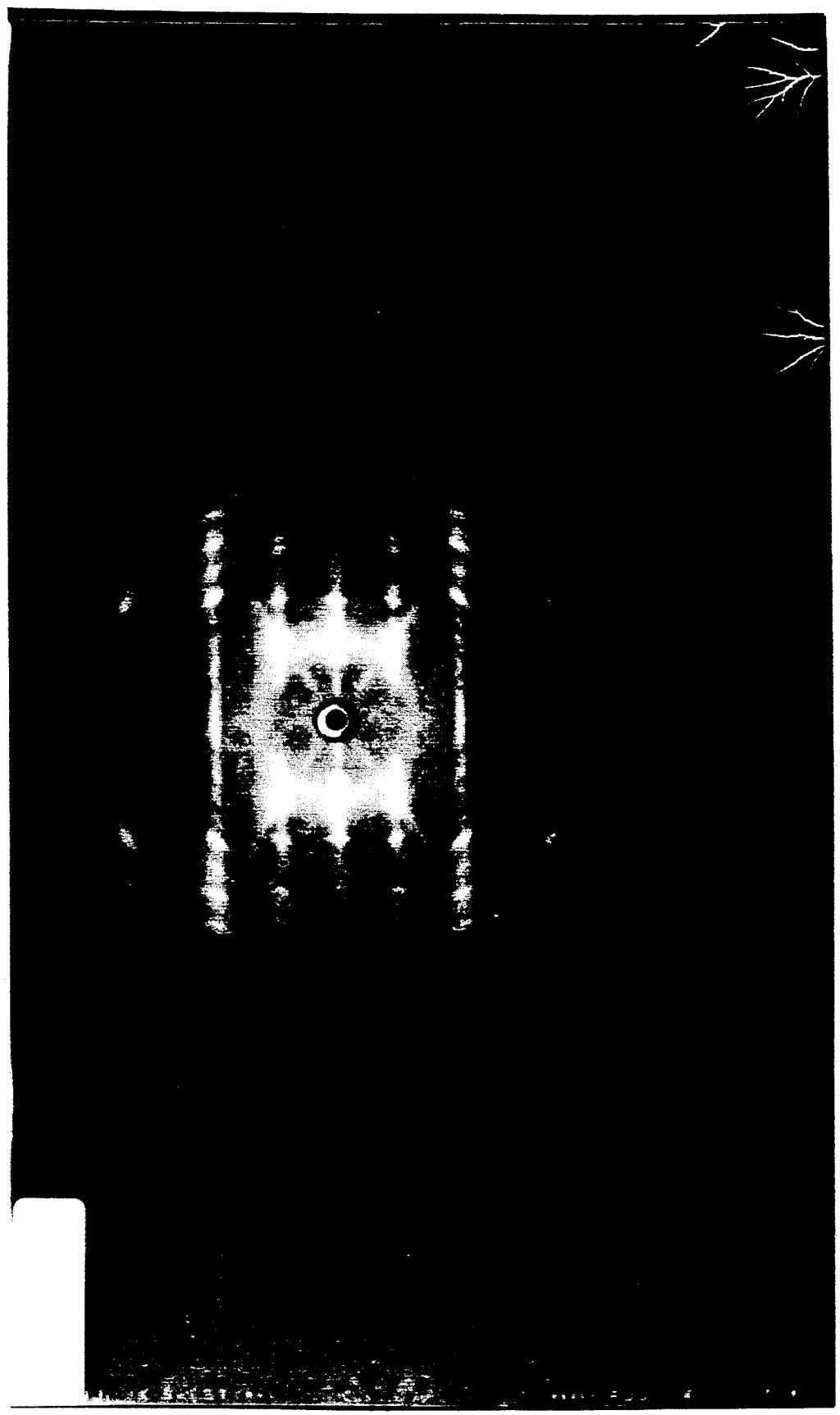
FIG. 7 shows a fiber photograph of a fiber stretched at 120° C. in Example 4 by a cylindrical camera.

When this fiber was stretched at 25° C. 10 times, maximum strength was 780 g and elongation was 25%, and the fiber was excellent in transparency. On the contrary, when the fiber was stretched at 120° C. (when stretched 6 times, the fiber was torn, and therefore it was stretched 5 times), the maximum strength was 680 g and the elongation was 20%. A fiber photograph of the unstretched fiber is shown in FIG. 5, and fiber photographs of the fibers stretched at 25° C. and 120° C. are shown in FIG. 6 and FIG. 7, respectively.

As is apparent from these fiber photographs of the fibers, the unstretched fiber is almost amorphous, and the fiber stretched at 25° C. has a transzigzag structure, but with regard to the fiber stretched at 120° C., a diffraction image other than the transzigzag structure is observed.

EXAMPLE 5

3,5-di-t-butyl-4-hydroxytoluene, calcium stearate and octadecyl-3-(3,5-di-t-butyl-4-hydroxyphenyl)propionate were added to the polypropylene obtained in Example 1 in an amount of 0.1 wt. %, 0.08 wt. % and 0.045 wt. %, respectively, and grains were formed from the mixture and then melted and pressed at 200° C. to prepare a sheet having a thickness of 1 mm. For this sheet, physical properties were measured in the same manner as in Example 1, and as a result, flexural stiffness was 5,300 kg/cm², tensile yield strength was 240 kg/cm², elongation at breakage was 520%, Izod impact strengths (23° C., −10° C.) were 14.2 and 3.6, respectively, and haze was 28%.

This sheet was stretched at 30° C. 3 times, and for the resultant stretched film, physical properties were measured. As a result, tensile strength was 650 kg/cm², elongation was 78%, and the haze was 32%. This stretched film was placed in a sealed vessel in a stretched state, and it was then treated at 30° C. for 6 hours with toluene vapor. The film was kept stretched at 80° C. for 5 hours, and physical properties were measured. As a result, the tensile strength was 690 kg/cm$^2$, elongation was 60%, and the haze was 12%. It is apparent from these results that the transparency of the film is improved by treating it with a toluene vapor.

On the other hand, when the film was subjected to a heat treatment in a stretched state without treating with toluene vapor, the tensile strength was 680 kg/cm$^2$, elongation was 55%, and the haze was 35%, and thus transparency was not improved.

EXAMPLE 6

The same procedure as in Example 5 was effected except that a sheet was stretched at 120° C. and then treated with toluene vapor at 50° C. for 30 minutes, and in this case, tensile strength was 680 kg/cm$^2$, elongation was 85%, and haze was 18%. The haze prior to the treatment with toluene was 38%.

EXAMPLE 7

The same procedure as in Example 5 was effected except that toluene was replaced with xylene, and in this case, tensile strength was 685 kg/cm$^2$, elongation was 70%, and haze was 14%.

EXAMPLE 8

Calcium stearate and 2,6-di-t-butylphenol were added to the polypropylene obtained in Example 1 in a ratio of 10 of each of calcium stearate and 2,6-di-t-butylphenol to 10,000 of the polypropylene and talc was further added thereto in a ratio of 10 of talc to 10,000 of the polypropylene, and grains were formed from the mixture. Afterward, spinning was carried out at 220° C. through 14 holes in the die of an extruder having a cylinder diameter of 40 mm at a screw rotational frequency of 64 rpm. Strands coming from the die were introduced into brine at −10° C. and then quenched therein. The thus obtained fiber had a thickness of 370 D/14 strands, and according to a tensile test, maximum strength was 480 g and elongation was 680%.

Figure 8:
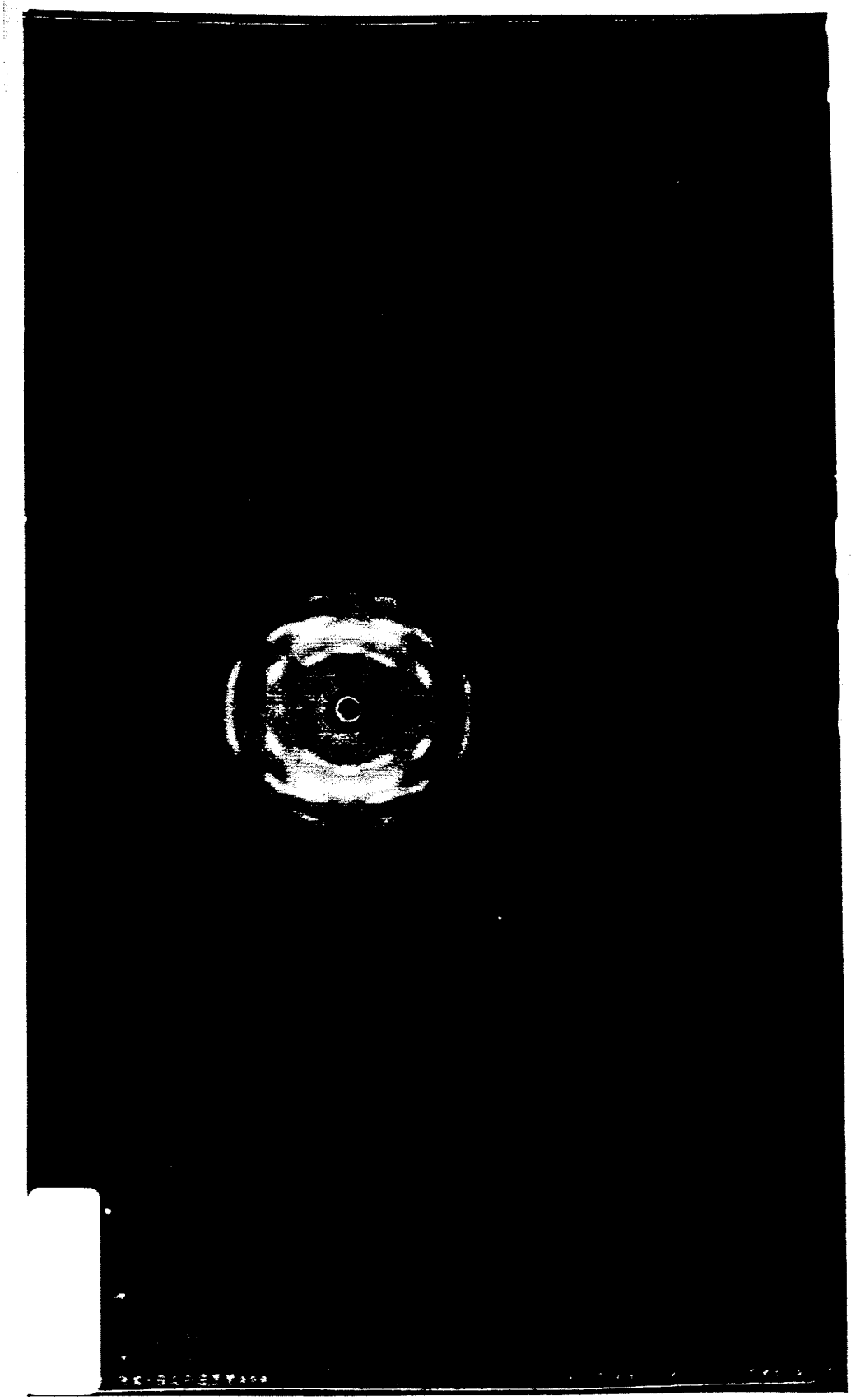
FIG. 8 shows a fiber photograph of a fiber stretched and treated with a benzene vapor in Example 8 by a cylindrical camera.
Figure 9A:
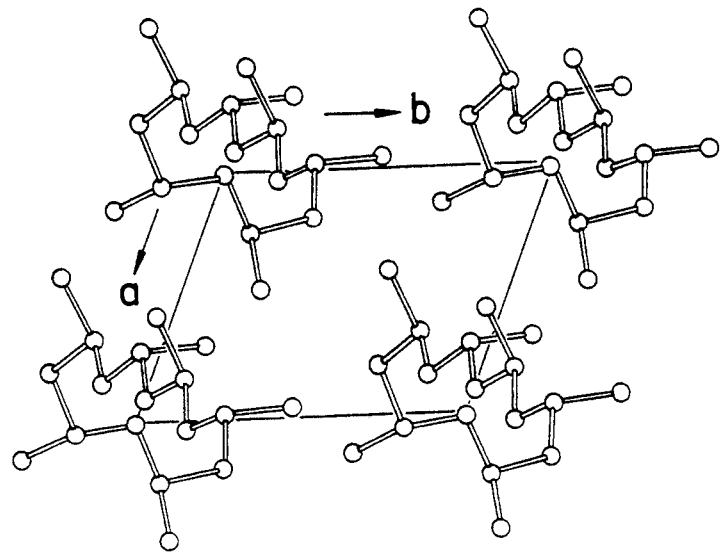
FIGS. 9A and 9B show the crystalline structure of a fiber determined from the results of the fiber photograph.
Figure 9B:
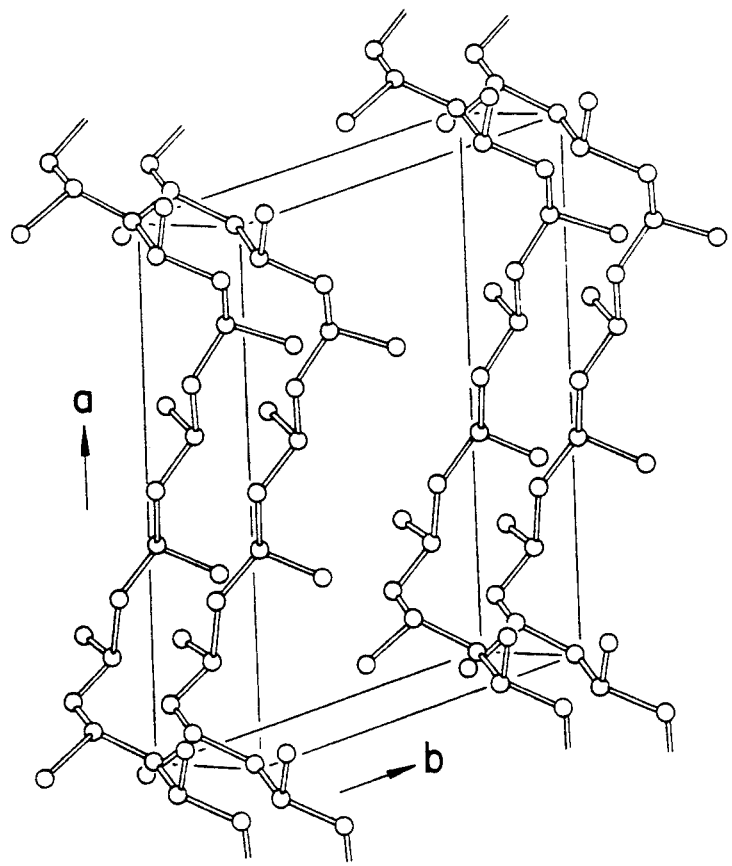

When this fiber was stretched at 25° C. 10 times, maximum strength was 780 g and elongation was 25%, and the fiber was extremely excellent in transparency. When this stretched fiber was treated with benzene vapor at 40° C. for 24 hours, maximum strength was 820 and elongation was 20%. A fiber photograph of the fiber obtained by a cylindrical camera is shown in FIG. 8. A crystalline structure determined from the measured results of the fiber photograph is shown in FIGS. 9A and 9B.

EXAMPLE 9

In a 2-liter autoclave, 10 mg of isopropyl(cyclopentadienyl-1-fluorenyl)zirconium dichloride obtained without purification and 1.34 g of methylaluminoxane having a polymerization degree of about 15 obtained by reacting copper sulfate hexahydrate with trimethylaluminum in toluene were dissolved in 1 liter of toluene, and propylene was polymerized at 50° C. under a polymerization pressure of 2 kg/cm$^2$-G for 1 hour. After completion of the polymerization, unreacted propylene was purged, and the resultant slurry was collected, filtered at 30° C., washed with 500 ml of toluene 5 times, and then dried under reduced pressure to obtain 98 g of polypropylene. According to $^{13}$C-NMR, the syndiotactic pentad fraction of this polypropylene was 0.902, η was 0.88, and MW/MN was 2.2.

This polypropylene was press-molded at 250° C. to form a sheet having a thickness of 1 mm, and the thus formed sheet was then cooled to 20° C. in 5 minutes, and then stretched at 100° C. twice. According to an X-ray diffraction spectrum, the intensity of the diffraction lines observed at about 7.1Å decreased to about ½ by this stretching. Physical properties of the sheet were measured, and as a result, for the unstretched sheet, tensile strength was 580 kg/cm$^2$, elongation was 420% and haze was 15.2%, and for the stretched sheet, the tensile strength was 660 kg/cm$^2$, the elongation was 85%, the haze was 22.6%.

Furthermore, the stretched sheet was kept stretched at 130° C. for 30 minutes, and physical properties were then measured. As a result, the tensile strength was 780 kg/cm$^2$, the elongation was 55%, the haze was 26%, and crystallinity measured from an X-ray diffraction spectrum was 78%. On the contrary, the crystallinity of the unstretched sheet was 52%, and that of the stretched sheet was unclear since broad diffraction lines were observed, but it seemed about 40%. As is apparent from the foregoing, the crystallinity is improved remarkably by the heat treatment, and the physical properties are also enhanced.

EXAMPLE 10

The same procedure as in Example 9 is effected except that a heating treatment was carried out at 110° C. for 1 hour, thereby obtaining a film. With regard to physical properties of this film, tensile strength was 760 kg/cm$^2$, elongation was 48% and haze is 28%. In addition, crystallinity measured from an X-ray spectrum is 72%.

EXAMPLE 11

Calcium stearate and 2,6-di-t-butylphenol were added to the syndiotactic polypropylene obtained in Example 9 in a ratio of 10 of each of calcium stearate and 2,6-di-t-butylphenol to 10,000 of the polypropylene and talc was further added thereto in a ratio of 10 of talc to 10,000 of the polypropylene, and grains were formed from the mixture. Afterward, spinning was carried out at 220° C. through 14 holes in the die of an extruder having a cylinder diameter of 40 mm at a screw rotational frequency of 64 rpm. Strands coming from the die were cooled in the air. The thus obtained fiber had a thickness of 370 D/14 strands, and according to a tensile test, maximum strength was 480 g and elongation was 150%.

This fiber was stretched at 60° C. twice, and according to a tensile test, maximum strength was 560 g and elongation was 40%. According to an X-ray diffraction spectrum, the intensity of the diffraction lines observed at about 7.1Å decreased to about ½ by this stretching. Furthermore, the fiber was kept stretched at 100° C. for 2 hours, and according to a tensile test, the maximum strength was 620 g and the elongation was 15%. In addition, crystallinity was 72%.

EXAMPLE 12

2.5 mg of isopropyl(cyclopentadienyl-1-fluorenyl)-zirconium dichloride and 0.34 g of methylaluminoxane (polymerization degree 16.1) made by Toso Akzo Co., Ltd were dissolved in 1 liter of toluene in a 2-liter autoclave. This isopropyl(cyclopentadienyl-1-fluorenyl)-zirconium dichloride was obtained by converting, into a lithium salt, isopropylcyclopentadienyl-1-fluorene synthesized in an ordinary manner, reacting the same with zirconium tetrachloride, and then recrystallizing the resultant reaction product. Afterward, propylene was added to the solution at 20° C. until 3 kg/cm²-G was reached, and ethylene was added thereto at 1.0 g/minute for 10 seconds every 10 minutes. Propylene was additionally added to the solution so that polymerization pressure might be 3 kg/cm²-G, and copolymerization was carried out for 3.5 hours. Next, methanol and acetoacetic ester were added to the solution, treated at 30° C., washed with an aqueous hydrochloric acid solution, and then filtered to obtain a propylene-ethylene copolymer containing 2.0 wt.% of ethylene units.

In the $^{13}$C-NMR absorption spectrum of this copolymer, a peak intensity observed at about 20.2 ppm is 0.89 of the total peak intensity attributed to the methyl groups of all the propylene units, $\eta$ was 1.24, and MW/MN measured in a 1,2,4-trichlorobenzene solution was 2.3.

This copolymer was molded into a sheet in the same manner as in Example 1, and for this sheet, physical properties were measured. As a result, flexural stiffness was 4,300 kg/cm², tensile yield strength was 198 g/cm², elongation at breakage was 635%, Izod impact strengths (23° C., −10° C.) were 18.0 and 4.2, respectively, and haze was 12%.

This sheet was stretched under the same conditions as in Example 1, and physical properties of the stretched sheet were measured. As a result, tensile strength was 580 kg/cm², elongation was 150%, and the haze was 6.2%.

EXAMPLE 13

10 parts by weight of commercially available isotactic propylene pellets (trade name JS-1429 made by Mitsui Toatsu Chemicals, Inc.) and 10 parts by weight of 3,5-di-t-butyl-4-hydroxytoluene, 8 parts by weight of calcium stearate and 4.5 parts by weight of octadecyl-3-(3,5-di-t-butyl-4-hydroxyphenyl)propionate were added to 10,000 parts by weight of the syndiotactic propylene obtained in Example 1, and the grains were formed from the mixture. Afterward, the grains were then melted and pressed at 200° C., and the resultant sheet was thrown into water at 0° C.

This sheet was stretched at 10° C. 5 times, and physical properties were then measured. As a result, tensile strength was 910 kg/cm², elongation was 58% and haze is 12.5%.

What is claimed is:

1. A molded article obtained by melting and molding a propylene polymer into a molded article, quenching the molded article at a cooling rate of 50° C. or more per minute and then stretching the quenched article, said propylene polymer being selected from the group consisting of: a propylene homopolymer having a substantially syndiotactic structure wherein the absorption spectrum of $^{13}$C-NMR of the propylene homopolymer measured in a 1,2,4-trichlorobenzene solution, a peak intensity of methyl groups attributed to the syndiotactic structure observed at about 20.2 ppm on the basis of tetramethylsilane is 0.7 or more of the total peak intensity of all the methyl groups; a copolymer of propylene and ethylene or another α-olefin having 4 to 20 carbon atoms wherein in the absorption spectrum of $^{13}$C-NMR of said copolymer measured in a 1,2,4-trichlorobenzene solution, a peak intensity observed at about 20.2 ppm on the basis of tetramethylsilane is 0.5 or more of the total peak intensity attributed to the methyl groups of all the propylene units; and a mixture of said homopolymer or said copolymer with a small amount of polypropylene having a substantially isotactic structure; said molded article having a crystalline structure of a substantially transzigzag structure which is a rhombic system having lattice constants of a=5.22, b=11.17 and c=50.6 Å in accordance with an X-ray diffraction.

2. A molded article obtained by melting and molding a propylene polymer selected from a propylene homopolymer having a substantially syndiotactic structure or a copolymer of propylene and ethylene or another α-olefin, said copolymer having a substantially syndiotactic structure, or a mixture of the propylene homopolymer or the copolymer with a small amount of polypropylene having a substantially isotactic structure, quenching and stretching the molded article, and then treating the stretched article with the vapor of a hydrocarbon compound; said molded article having a triclinic system having lattice constants of a=5.72, b=7.64, c=11.6Å, α=73.1°, β=88.8° and γ=112.0° in accordance with an X-ray diffraction.

* * * * *